United States Patent [19]

Nakamura et al.

[11] Patent Number: 4,547,549

[45] Date of Patent: Oct. 15, 1985

[54] PROCESS FOR PRODUCING POWDERY COMPOSITE POLYMER

[75] Inventors: Mamoru Nakamura; Fumio Shibata, both of Takaoka, Japan

[73] Assignee: Nippon Zeon Co. Ltd., Tokyo, Japan

[21] Appl. No.: 698,681

[22] Filed: Feb. 5, 1985

[30] Foreign Application Priority Data

Feb. 6, 1984 [JP]  Japan .................................. 59-19764

[51] Int. Cl.[4] ...................... C08L 27/06; C08L 33/18
[52] U.S. Cl. .................................. 525/197; 525/233; 525/238; 524/501
[58] Field of Search ...................... 525/233, 238, 197; 524/501

[56] References Cited

U.S. PATENT DOCUMENTS

| | | | |
|---|---|---|---|
| 3,145,189 | 8/1964 | Fourier | 524/501 |
| 3,151,186 | 9/1964 | Lucke | 524/501 |
| 3,796,677 | 3/1974 | Laber et al. | 525/84 |
| 4,194,999 | 3/1980 | Hayashi et al. | 525/233 |
| 4,230,832 | 10/1980 | Wei | 525/260 |

Primary Examiner—Carman J. Seccuro
Attorney, Agent, or Firm—Sherman & Shalloway

[57] ABSTRACT

A process for producing a powdery composite polymer, which comprises mixing in an aqueous medium (A) a particulate vinyl chloride polymer, (B) an elastomer containing a nitrile group and (C) a solvent for the elastomer (B) which is not miscible with water and is a poor solvent for the polymer (A), thereafter removing the solvent (C) from the mixture, and dehydrating and drying the mixture thereby to form a powdery composite polymer composed of the vinyl chloride polymer (A) and the nitrile group-containing elastomer (B).

6 Claims, No Drawings

PROCESS FOR PRODUCING POWDERY COMPOSITE POLYMER

This invention relates to a process for producing a powdery composite polymer composed of a vinyl chloride polymer (to be sometimes referred to hereinbelow as PVC) and an elastomer containing a nitrile group which has excellent processability and gives products having excellent properties, above all excellent oil resistance and suppleness, and in which in its unmelted state before being subjected to ordinary kneading, the vinyl chloride polymer and the elastomer are finely dispersed.

It has been the previous practice to impart suppleness to PVC by adding an acrylonitrile-butadiene copolymer rubber (NBR) as a non-extracting and non-migrating polymeric plasticizer, or to improve the ozone resistance, flexural and cracking resistance, oil resistance, abrasion resistance and processability of NBR by mixing it with PVC. Mixing of PVC and NBR in this case is usually carried out by dry blending or latex blending. Since they are not always uniformly dispersed, the desired properties cannot sufficiently be developed in many cases.

Furthermore, since the mixture of the two is usually in the form of a sheet or pellets, it is difficult to handle by a mixing or molding device. Frequently, therefore, such a mixture is required to be in finer particles.

It is an object of this invention to overcome the aforesaid various defects of a mixture of PVC and NBR.

The present inventors have found that by mixing particulate PVC and a nitrile group-containing elastomer under specific conditions, there can be obtained a composite polymer which has good processability and gives products having excellent oil resistance and suppleness and in which the two polymers are finely dispersed.

Thus, according to this invention, there is provided a process for producing a powdery composite polymer composed of (A) PVC and (B) a nitrile group-containing elastomer (B), which comprises mixing in an aqueous medium (A) particulate PVC, (B) the nitrile group-containing elastomer and (C) a solvent for the elastomer (B) which is not miscible with water and is a poor solvent for the polymer (A), thereafter removing the solvent (C) and dehydrating and drying the mixture.

Examples of the particulate PVC used in this invention include a homopolymer of vinyl chloride, copolymers of vinyl chloride with other monomers copolymerizable therewith, and graft copolymers of vinyl chloride with other polymers. The PVC has an average particle diameter of usually not more than 200 micrometers, preferably not more than 150 micrometers. There is not particular limitation on its lower limit, but PVC obtained by ordinary methods has an average particle diameter of 0.01 micrometer at the smallest. When its particle diameter exceeds the above upper limit, products prepared from the resulting composite polymer have insufficient uniformity, and deleterious results such as poor appearance and strength are obtained. PVC may be produced by any methods such as emulsion polymerization, suspension polymerization, bulk polymerization or vapor-phase polymerization. It may be in a dehydrated and dried form, or in the form of a slurry or latex as obtained upon the termination of the polymerization reaction. Usually, PVC has a degree of polymerization of 300 to 5000.

The nitrile group-containing elastomer used in this invention may, for example, be a copolymeric elastomer of a nitrile monomer and a monomer copolymerizable therewith, or a product obtained by introducing a nitrile group into an elastomer. In the case of the former, the content of the nitrile monomer is 5 to 80% by weight, preferably 15 to 60% by weight. If the amount of the nitrile monomer is less than 5% by weight, the resulting elastomer has poor oil resistance and has poor compatibility with PVC. Hence, the strength and other properties of the resulting composite polymer are not exhibited. On the other hand, when the amount of the nitrile monomer exceeds 80% by weight, the resulting composite polymer has poor suppleness. Examples of the nitrile monomer are acrylonitrile, methacrylonitrile, alpha-chloroacrylonitrile, alpha-cyanoethylacrylonitrile, vinylidene cyanide, maleonitrile and allyl cyanide. Examples of the monomer copolymerizable with the nitrile monomer are monolefins such as ethylene, propylene, isobutylene and butene-1; diolefins such as butadiene, isoprene, chloroprene and 1,3-pentadiene; unsaturated acids such as acrylic acid and methacrylic acid; and unsaturated acid esters such as alkyl (e.g., methyl, ethyl, butyl, or 2-ethylhexyl) esters of these acids. Two or more of these nitrile monomers and other monomers respectively may be contained in the copolymer. Such nitrile group-containing elastomers are produced mainly by emulsion polymerization or solution polymerization. The elastomers may be in the form of cut pieces or fragments of suitable sizes obtained by cutting or crushing a bale or sheet, a latex obtained by emulsion polymerization, a crumb resulting from coagulation of the latex, or a solution obtained by solution polymerization.

The mixing proportions of PVC and the nitrile group-containing elastomer are 1 to 99% by weight for the former and 99 to 1% by weight for the latter, preferably 20 to 80% by weight for the former and 80 to 20% by weight for the latter, in the mixture, and are properly determined according to the purpose for which the composite polymer is used.

The solvent (C) for the nitrile group-containing elastomer may be any solvent which is not miscible with water, is a poor solvent for PVC, and dissolves or swells the nitrile group-containing elastomer. Examples include benzene, toluene, cyclohexane, octyl alcohol, decyl alcohol, vinyl chloride, vinylidene chloride and 1,2-dichloroethylene. Two or more of these may, of course, be used in combination. Vinyl chloride is much preferred because it has a low boiling point and does not significantly remain in the polymer, it can be easily recovered, and it is available easily at low cost. The amount of the solvent used is 30 to 1000 parts by weight per 100 parts by weight of the nitrile group-containing elastomer.

In the present invention, there is no particular restriction on the method of mixing the polymers. For example, PVC, the nitrile group-containing elastomer and the solvent may be mixed together in the presence of an aqueous medium. Or the nitrile group-containing elastomer is first dissolved in the solvent, and the solution is then mixed with PVC and water. The method of mixing may be properly selected according to the solubility of the nitrile group-containing elastomer in the solvent.

The amount of the aqueous medium, i.e. the amount of water, in this invention is usually at least 30 parts by weight, preferably at least 100 parts by weight, per 100 parts by weight of PVC and the nitrile group-containing elastomer combined. If it is less than 30 parts by weight, PVC becomes tacky by the nitrile group-containing elastomer dissolved in the solvent and assumes the form of a block, and the desired particulate composite polymer cannot be obtained. There is no particular restriction on the upper limit of the amount of water. However, if, for example, water is used in an amount exceeding 500 parts by weight per 100 parts by weight of PVC and the nitrile group-containing elastomer combined, the amount of the composite polymer produced per batch decreases, and the efficiency of production is poor.

The aqueous medium used in this invention may contain a dispersant or an emulsifier in an amount of up to 10 parts by weight, preferably 0.001 to 5 parts by weight, per 100 parts by weight of PVC and the nitrile group-containing elastomer combined. When the amount of the nitrile group-containing elastomer is relatively large, the copresence of a dispersant or emulsfier is preferred. Since the PVC slurry or latex as obtained upon termination of polymerization contains a dispersant or emulsifier, it is sometimes convenient to use such a slurry or latex directly.

Examples of the dispersant include a partial saponification product of polyvinyl acetate; cellulose derivatives such as alkylcelluloses; polymeric electrolytes such as polyvinyl pyrrolidone, polyacrylic acid and polyacrylic acid salts; synthetic water-soluble polymeric substances such as a maleic anhydride/vinyl acetate copolymer; natural polymeric substances such as starch, gelatin and tragacanth; and mixtures of these.

Various surface-active agents can be used as the emulsifier. Examples include partial esters of polyhydric alcohols such as sorbitan monolaurate, sorbitan trioleate and glyceryl monostearate; ethers such as polyoxyethylenenonylphenyl ether; polypropylene glycol/polyethylene glycol block copolymer; higher alcohols; higher fatty acid salts such as sodium stearate and potassium oleate; sodium alkylsulfates such as sodium laurylsulfate; sodium alkylarylsulfonates such as sodium dodecylbenzenesulfonate; and sodium alkylsuccinates.

An autoclave equipped with a stirrer is used as a vessel in which PVC, the nitrile group-containing elastomer and the solvent are mixed in this invention. The temperature at which the mixing is effected differs depending upon the types or amounts of the two polymers. Usually, it is room temperature to 80° C. It is not necessary to limit the stirring conditions in particular, and conditions under which the mixture flows and disperses may be selected. The mixing time is not particularly restricted, either. Usually, it is from 30 minutes to 3 hours. As required, it is possible to add ordinary plasticizers, stabilizers, ultraviolet absorbers, antioxidants, vulcanizing agents, lubricants, pigments, fillers, reinforcing agents, etc. at the time of the mixing operation. To obtain a powder of a suitable size, an acid, an alkali, a salt, a coagulating agent, etc. may be added.

Thus, according to this invention, a powdery composite polymer having excellent properties in which PVC and the nitrile group-containing elastomer are uniformly dispersed can be obtained.

The following examples illustrate the present invention specifically. All parts and percentages in these examples are by weight. The various properties of the samples obtained in the examples were tested by the following methods.

To 100 parts of the composite polymer sample were added 2.5 parts of a BA-Zn stabilizer (composed of 1.5 parts of Mark RUP-14 made by Adeka-Argus Co. and 1.0 part of Mark AC-186 of the same company) and 3 parts of epoxidized soybean oil. The mixture was kneaded on a roll at 160° C. for 5 minutes to form a sheet. The sheet was pressed for 5 minutes at a temperature of 170° C. under a pressure of 50 kg/cm$^2$. The pressed sample was then tested for hardness, permanent compression set and tear strength (in accordance with JIS K-6301) and tensile properties and oil resistance (in accordance with JIS K-6723).

EXAMPLE 1

A stainless steel autoclave equipped with a stirrer was charged with 200 parts of water, 0.5 part of hydroxypropyl methyl cellulose, 50 parts of a vinyl chloride polymer having a degree of polymerization of 1000 and an average particle diameter of 90 micrometers, 125 parts of a latex (solids 40%) of NBR obtained by emulsion polymerization [acrylonitrile content 41%; Mooney viscosity (ML$_{1+4}$100° C.) 63] and 50 parts of a vinyl chloride monomer, and these materials were stirred at 40° C. The vinyl chloride monomer was recovered, and the residue was dehydrated and dried to obtain a powdery composite polymer having an average particle diameter of 120 micrometers.

EXAMPLE 2

A powdery composite polymer having an average particle diameter of 60 micrometers was obtained by repeating the method of Example 1 except that 50 parts of a vinyl chloride polymer having a degree of polymerization of 1000 and an average particle diameter of 30 micrometers was used instead of the vinyl chloride polymer used in Example 1, and 50 parts of a crumb obtained by coagulating the latex of NBR used in Example 1 was used instead of the NBR latex used in Example 1.

EXAMPLE 3

A stainless steel autoclave equipped with a stirrer was charged with 200 parts of water, 2 parts of hydroxypropyl methyl cellulose, 0.1 part of sodium dodecylbenzenesulfonate and 0.05 part of di-2-ethylhexyl peroxydicarbonate. The inside of the autoclave was deaerated, and 100 parts of a vinyl chloride polymer was added. The polymerization was started at 58° C. When the polymerization conversion reached 60%, 0.02 part of di-tert-butylhydrotoluene was added to stop the polymerization and obtain a PVC slurry having an average particle diameter of 20 micrometers.

The PVC slurry was then transferred into a separate stainless steel autoclave equipped with a stirrer and containing 60 parts of water, 60 parts of square pieces having one side measuring about 5 mm (obtained by coagulating the same NBR latex as used in Example 1, drying the crumb and cutting the resulting sheet having a thickness of 2 mm), and 20 parts of a vinyl chloride monomer. These materials were stirred at 40° C. for 1 hour. Vinyl chloride was recovered, and the residue was dehydrated and dried to give a powdery composite polymer having an average particle diameter of 50 micrometers.

COMPARATIVE EXAMPLE 1

A sheet-like composite polymer was prepared by mixing 50 parts of the same vinyl chloride polymer as used in Example 1 and 50 parts of the same square pieces of NBR as use in Example 3 by a roll.

EXAMPLE 4

A powdery composite polymer having an average particle diameter of 180 micrometers was produced by repeating the method of Example 1 except that 50 parts of a vinyl chloride polymer having a degree of polymerization of 1000 and an average particle diameter of 120 micrometers was used instead of the vinyl chloride polymer used in Example 1, and 50 parts of pellets of NBR [acrylonitrile content 33%; Mooney viscosity $(ML_{1+4}\ 100°\ C.)$ 78] was used instead of the NBR latex used in Example 1.

COMPARATIVE EXAMPLE 2

A sheet-like composite polymer was produced by mixing 50 parts of the same vinyl chloride polymer as used in Example 4 and 50 parts of the same NBR pellets as used in Example 4.

EXAMPLE 5

A stainless steel autoclave equipped with a stirrer was charged with 0.5 part of hydroxypropyl methyl cellulose, 100 parts of a latex (solids 50%) of a vinyl chloride polymer having a degree of polymerization of 1000 and an average particle diameter of 1.2 micrometers, 125 parts of a latex (solids 40%) of an acrylonitrile-/butadiene/isoprene terpolymer [acrylonitrile 35%, butadiene 40%, isoprene 25%; Mooney viscosity $(ML_{1+4}\ 100°\ C.)$ 78] and 40 parts of a vinyl chloride monomer, and these materials were stirred at 40° C. for 1 hour. The vinyl chloride monomer was recovered, and the residue was dehydrated and dried to give a powdery composite polymer having an average particle diameter of 250 micrometers.

COMPARATIVE EXAMPLE 3

A mixture of 100 parts of the same vinyl chloride polymer latex as used in Example 5 and 125 parts of the same terpolymer latex as used in Example 5 was coagulated by adding a 2% aqueous solution of calcium chloride. The coagulated product was dried to form a crumb-like composite polymer.

EXAMPLES 6 AND 7

Powdery composite polymers having an average particle diameter of 110 micrometers and 130 micrometers were obtained respectively in the same way as in Example 1 except that the ratio of PVC/NBR was changed to 70/30 (Example 6) and 30/70 (Example 7), respectively.

EXAMPLE 8

A powdery composite polymer having an average particle diameter of 150 micrometers was obtained in the same way as in Example 1 except that 1,2-dichloroethylene was used instead of the vinyl chloride monomer.

The composite polymers obtained in the foregoing examples were tested for the properties indicated in Table 1, and the results are summarized in Table 1. These results demonstrate the superiority of the properties of the composite polymers obtained in Examples to those of the composite polymers obtained in Comparative Examples.

TABLE 1

| Example (Ex.) or Comparative Example (CEx.) | | Ex. 1 | Ex. 2 | Ex. 3 | CEx. 1 | Ex. 4 | CEx. 2 | Ex. 5 | CEx. 3 | Ex. 6 | Ex. 7 | Ex. 8 |
|---|---|---|---|---|---|---|---|---|---|---|---|---|
| Hardness (JIS (A)) | | 79 | 78 | 78 | 84 | 68 | 75 | 80 | 87 | 88 | 42 | 76 |
| Tensile strength $(kg/mm^2)$ | | 2.64 | 2.60 | 2.61 | 2.16 | 2.06 | 1.80 | 2.84 | 2.21 | 3.67 | 1.02 | 2.57 |
| Elongation (%) | | 450 | 460 | 450 | 400 | 540 | 480 | 550 | 490 | 390 | 600 | 460 |
| 100% Modulus $(kg/mm^2)$ | | 0.54 | 0.56 | 0.54 | 0.68 | 0.49 | 0.61 | 0.58 | 0.70 | 1.40 | 0.31 | 0.52 |
| Oil resistance | Percent retention of tensile strength (%) | 98.0 | 99.0 | 98.4 | 90.2 | 97.1 | 88.3 | 99.5 | 91.5 | 100 | 94.4 | 97.5 |
| | Percent retention of elongation (%) | 99.6 | 100 | 100 | 92.6 | 97.6 | 90.5 | 100 | 93.0 | 105 | 96.4 | 99.5 |
| Tear strength (kg/cm) | | 62.8 | 63.5 | 60.4 | 53.2 | 59.6 | 49.2 | 65.1 | 51.8 | 55.8 | 66.1 | 60.8 |
| Permanent compression set (%) | | 57.3 | 57.5 | 56.2 | 63.5 | 51.4 | 58.6 | 53.2 | 64.6 | 59.4 | 48.6 | 56.9 |

What is claimed is:

1. A process for producing a powdery composite polymer, which comprises mixing in an aqueous medium (A) a particulate vinyl chloride polymer, (B) an elastomer containing a nitrile group and (C) a solvent for the elastomer (B) which is not miscible with water and is a poor solvent for the polymer (A), thereafter removing the solvent (C) from the mixture, and dehydrating and drying the mixture thereby to form a powdery composite polymer composed of the vinyl chloride polymer (A) and the nitrile group-containing elastomer (B).

2. The process of claim 1 wherein the mixing ratio of the vinyl chloride polymer (A) to the nitrile group-containing elastomer (B) is from 1–99% by weight to 99–1% by weight.

3. The process of claim 1 wherein the solvent (c) is benzene, toluene, cyclohexane, octyl alcohol, decyl alcohol, vinyl chloride, vinylidene chloride or 1,2-dichloroethylene.

4. The process of claim 1 wherein the amount of the solvent (C) is 30 to 1000 parts by weight per 100 parts by weight of the nitrile group-containing elastomer (B).

5. The process of claim 1 wherein the amount of the aqueous medium is 30 to 500 parts by weight per 100 parts by weight of the vinyl chloride polymer (A) and the nitrile group-containing elastomer (B) combined.

6. The process of claim 1 wherein the aqueous medium contains a dispersant or emulsifier in an amount of not more than 10 parts by weight per 100 parts by weight of the vinyl chloride polymer (A) and the nitrile group-containing elastomer (B) combined.

* * * * *